(No Model.) 6 Sheets—Sheet 1.

A. F. WARD.
MACHINE FOR POINTING AND LAPPING HOOPS.

No. 484,126. Patented Oct. 11, 1892.

Witnesses:
P. M. Hulbert
A. Hamilton.

Inventor:
Alexander F. Ward
By T. J. W. Robertson
Att'y.

(No Model.) 6 Sheets—Sheet 2.

A. F. WARD.
MACHINE FOR POINTING AND LAPPING HOOPS.

No. 484,126. Patented Oct. 11, 1892.

Witnesses
F. R. Cornwall,
L. S. Bacon

Inventor
A. F. Ward
By his Attorneys
Thos. S. Sprague & Son (No Model.) 6 Sheets—Sheet 3.
A. F. WARD.
MACHINE FOR POINTING AND LAPPING HOOPS.
No. 484,126. Patented Oct. 11, 1892.
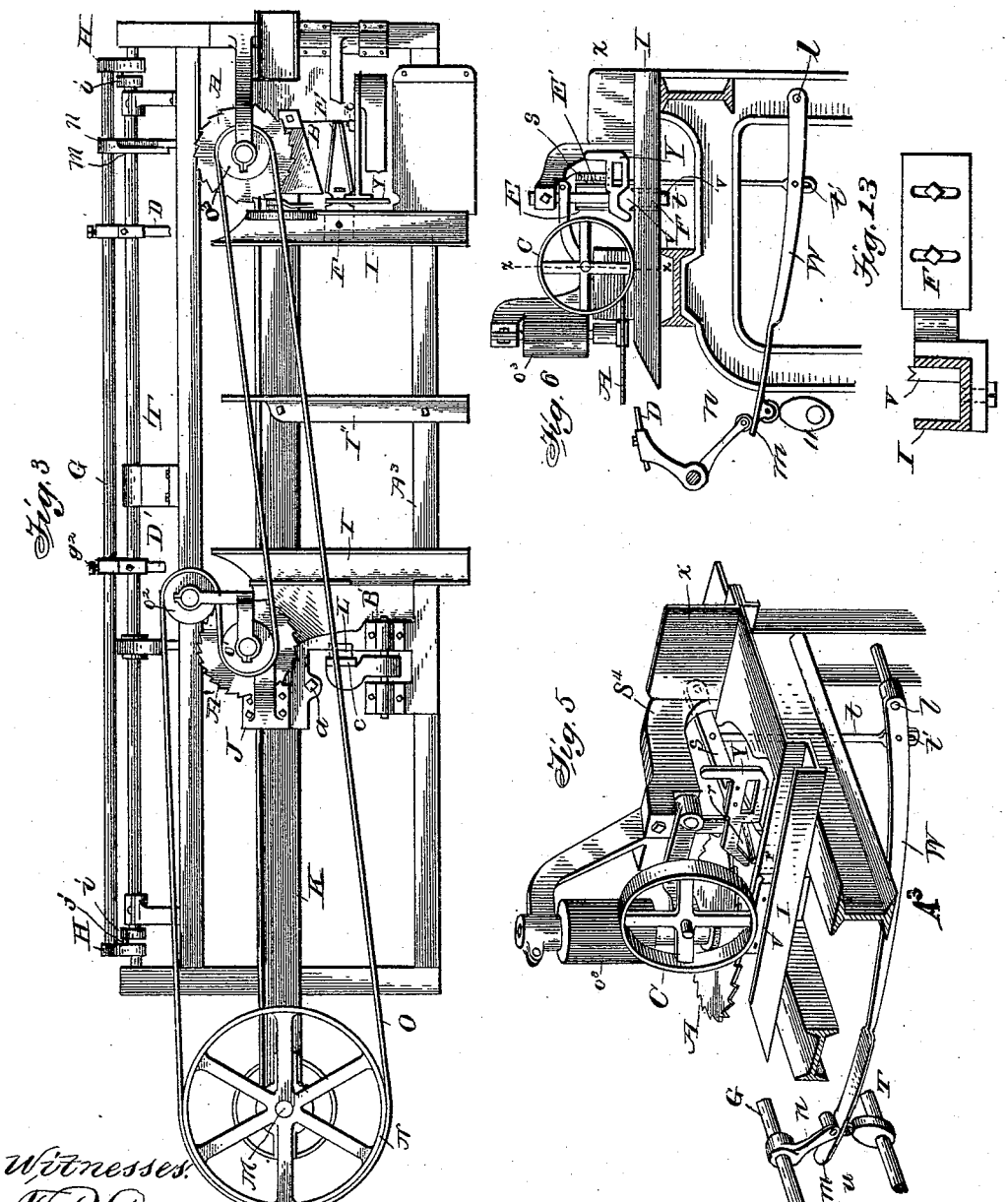

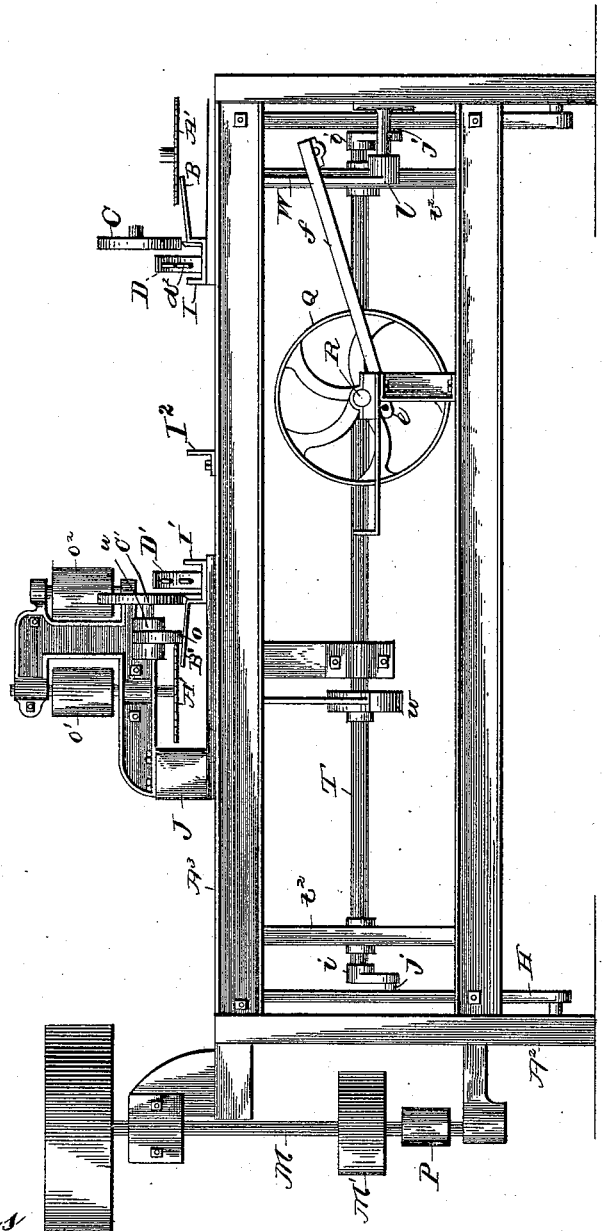

(No Model.) 6 Sheets—Sheet 5.
A. F. WARD.
MACHINE FOR POINTING AND LAPPING HOOPS.
No. 484,126. Patented Oct. 11, 1892.
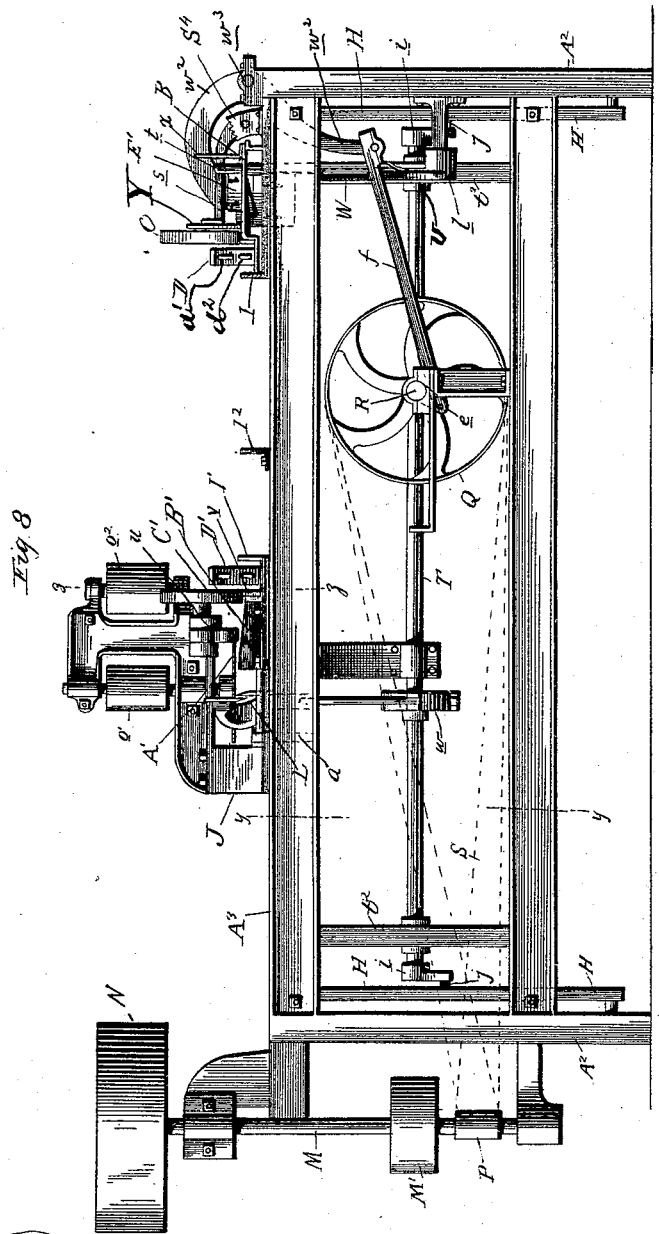
WITNESSES:
INVENTOR
Alexander F. Ward
BY J.W. Robertson
ATTORNEY.

(No Model.) 6 Sheets—Sheet 6.
A. F. WARD.
MACHINE FOR POINTING AND LAPPING HOOPS.
No. 484,126. Patented Oct. 11, 1892.
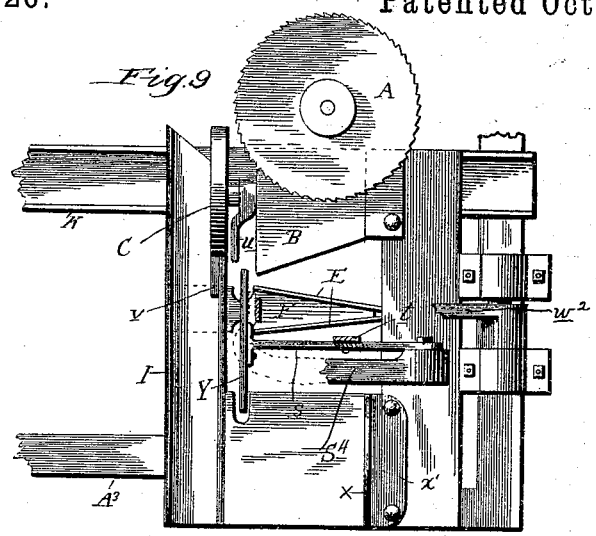
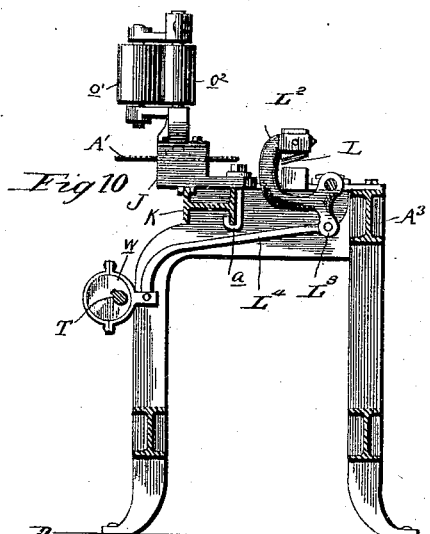
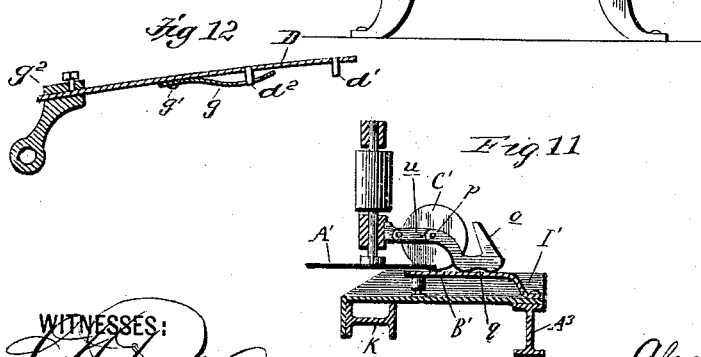
WITNESSES:
INVENTOR
Alexander F. Ward
BY J. W. Robertson
ATTORNEY.

UNITED STATES PATENT OFFICE.

ALEXANDER F. WARD, OF DETROIT, MICHIGAN, ASSIGNOR TO WILLIAM L'ESTRANGE MAHON, OF SAME PLACE.

MACHINE FOR POINTING AND LAPPING HOOPS.

SPECIFICATION forming part of Letters Patent No. 484,126, dated October 11, 1892.

Application filed September 23, 1886. Serial No. 214,333. (No model.)

*To all whom it may concern:*

Be it known that I, ALEXANDER F. WARD, of Detroit, in the county of Wayne and State of Michigan, have invented new and useful Improvements in Machines for Pointing and Lapping Hoops, of which the following is a full, clear, and exact description, reference being had to the annexed drawings, which form a part of this specification.
This invention relates to a new and useful improvement in machines for pointing and lapping hoops; and the invention is designed to form an improvement on a similar machine for which Letters Patent No. 305,868, dated September 30, 1884, were granted to me. Although my improved machine is of the same general plan, it differs therefrom in construction and in the addition of some new parts, all as hereinafter described, and set forth in the claims.

Figure 1:
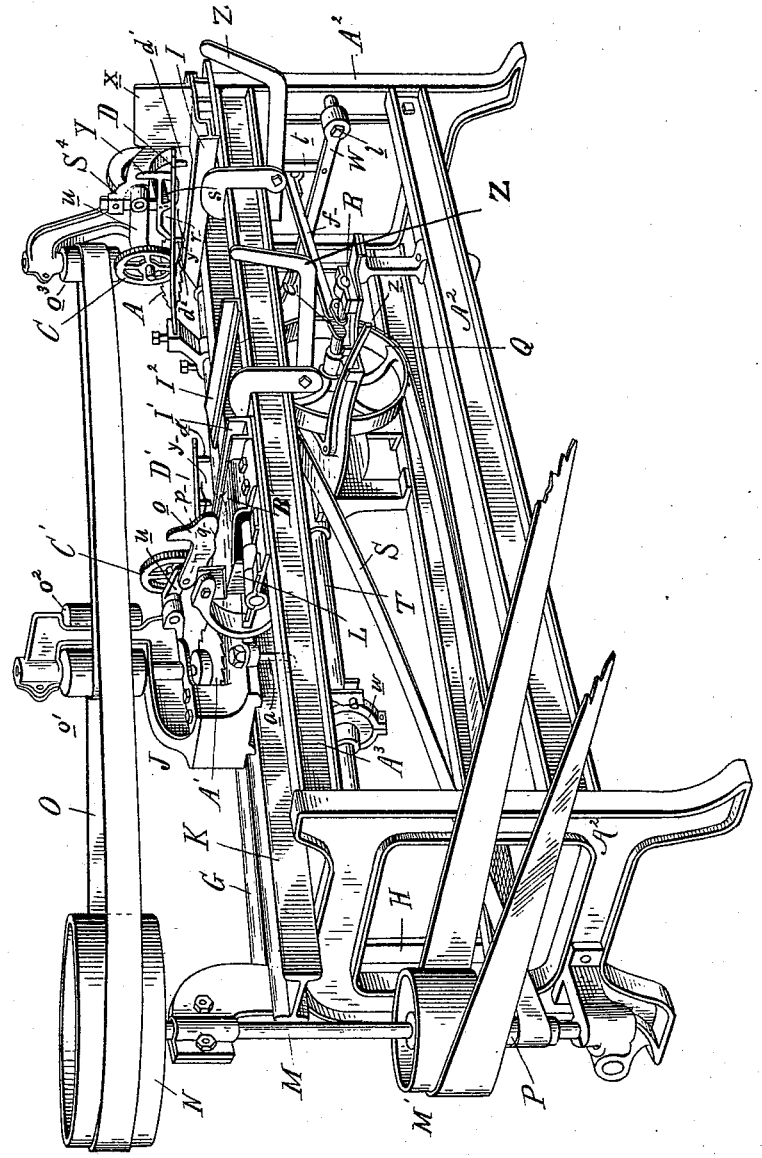
Figure 4:
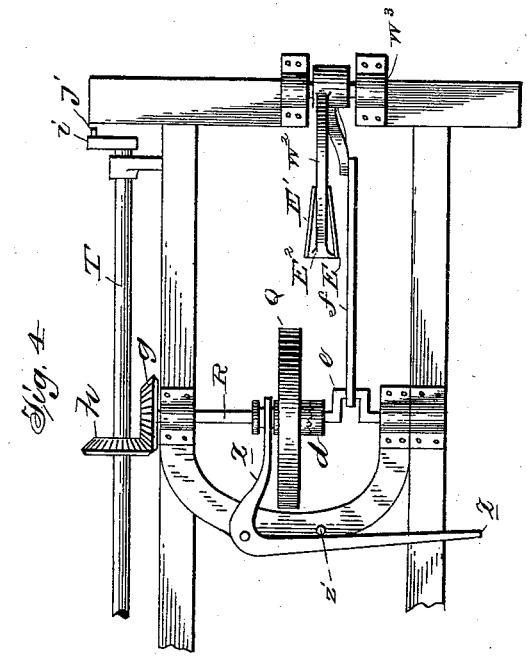
Figure 2:
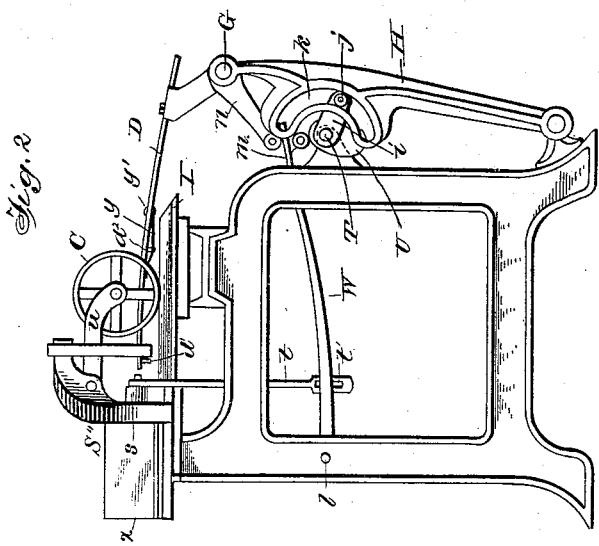

In the drawings which accompany this specification, Figure 1 is a perspective view of a machine looking at the front and showing the same complete as in operation. Fig. 2 is an end elevation of the machine looking from the right to the left end, showing a feed mechanism and pressure-foot and omitting the cutting-off and centering devices and the support for shaft T. Fig. 3 is a plan view of the machine with several parts broken away and omitted for the sake of clearness, such as the feed-hooks, pointing-shears, pressing devices, and mechanism for actuating the shears. Fig. 4 is a sectional plan view of the actuating mechanism for the shears, showing the remaining portions of the machine broken away and the adjacent parts omitted. Fig. 5 is a detail perspective view of the devices for centering the hoop for the pointing-shears, the mechanism for actuating the same, in connection with such parts of the machine as are necessary to show the relative location of the devices on the machine. Fig. 6 is a cross-section of the machine, showing in elevation substantially the same parts as are shown in Fig. 5. Fig. 7 is a front elevation of the machine with the adjustable lapping saw-carriage in position thereon, showing, also, a portion of the other lapping saw and adjacent parts. Fig. 8 is an elevation similar to Fig. 7, showing, in addition thereto, the devices for cutting, pointing, and centering the hoops for the shears and omitting one of the saws, and the supporting-brackets $S^4$ being broken away. Fig. 9 is a plan view of the right-hand end of the machine, designed to show the relation of the saw A, bed B, stationary shears F, centering device Y, pressure-foot C, and guide-plate X, all other parts being omitted or broken away. Fig. 10 is a cross-section of the machine on the line $y\ y$ of Fig. 8, especially designed to show the cutting-off shears, their actuating mechanism, and the means for adjusting the saw-carriage at the left-hand end of the machine. Fig. 11 is a detail cross-section through the frame in the plane of the adjustable saw-arbor, showing the inclined bed B, together with the pressure devices. Fig. 12 is a detail longitudinal section of one of the feed-hooks. Fig. 13 is a detail elevation of one of the stationary pointing-shears, showing its connection with one of the guides, which latter is shown in cross-section. The eccentric is held from rotating independent of the shaft and allowed a sliding movement thereon by a spline or rib formed on the shaft and working in a corresponding groove in the eccentric, as shown in Fig. 11.

A A' are two horizontal running circular saws arranged to cut the lap upon the opposite ends of the hoops simultaneously.

$A^2$ designates a suitable frame designed to support the operating parts hereinafter described. It is provided with a front rail $A^3$ for a purpose hereinafter explained.

B B' are inclined bed-plates underneath the saws for supporting and presenting the ends of the hoops at a slight incline to the horizontal saws.

C C' are pressure-rolls for pressing the ends of the hoops onto the bed-plates.

D D' are two hooked feed-arms actuated by a four-motion feed-movement, by means of which the hoops are carried across the top of the frame.

F is a V-shaped support for the end of the hoop while subjected to the operation of the pointing-shears. E E are the stationary knives of the pointing-shears, and are secured to the V-shaped support F, and E' E' are the knives which form the movable part of the pointing-shears and are secured to the head E² of the lever w², as shown in Figs. 4 and 6.

G is the rock-shaft which carries the feed-arms.

H H are two oscillating arms pivotally secured at their lower ends to the frame and carrying the rock-shaft G at their upper ends, and I I' I² are hoop-guides secured across the top of the frame to support the hoops.

All the parts above enumerated, with the exception of the pressure-rolls C C', movable guide I', and rail A³, forming a bearing for said guide, are substantially of the same construction and operation as in the above-mentioned patent, and I will now proceed to describe the other parts embodying my improvements.

A movable carriage J, Fig. 11, sliding on a longitudinal guide-rail K on top of the frame, carries the saw-arbor of the saw A', one of the two lapping saws, so that the machine may be adjusted for longer or shorter hoops, a clamp-bolt $a$ securing the carriage in any desired position.

L are shears of any suitable construction, arranged in front of the adjustable saw A', in the same relative position thereto as the pointing-shears are to the other saw, so that at the same time the hoop is pointed at one end it is cut off at the other end to a uniform length. The carriage J forms the bed, which carries with it all the parts at this end of the machine, as they have to maintain the same relative position in relation to the movable saw, such as the shears L, guides I', and inclined bed-plate B'. The bed-plate B' is extended toward the front and rests on the front rail A³ of the frame, said extension forming a table to support the end of the hoop when presented to the shears L.

At one end of the frame is journaled an upright shaft M, which constitutes the main shaft of the machine and to which the power is applied through pulley M'. To the upper end of the shaft M is secured a pulley N, from which motion is carried to the saws by means of a single belt O, passing over the pulley N, over the pulleys o' o² on the carriage J, and over the pulley o³, all so arranged, as shown in Fig. 3, that the saw-carriage may be adjusted without interfering with the adjustment of the belt. At the lower end of the shaft M is secured a pulley P, and another pulley Q is loosely journaled on a horizontal shaft R, supported within the frame. A belt S carries motion from the pulley P to the pulley Q, and from there by means of a clutch $d$ to the shaft R. From the shaft R motion is communicated to the pointing-shears by means of the rod $f$, connected at one end to the crank $e$ of said shaft and at the other end to the lever w², pivoted at W³, and at the other end carrying the movable knife or shear E². Motion is communicated from said shaft R to the shaft T through the medium of the miter-gear $g$ on the shaft R meshing with the miter-gear $h$ on said shaft T. The shaft T is journaled longitudinally in the frame at the rear side thereof and carries at each end a crank $i$, which by means of wrist $j$ engages into a suitably-curved slot $k$ in the oscillating arms H, and thereby causes quick forward and slow backward oscillations of the same. The shaft T also carries at one end a cam U, upon which the free end of the lever W rides. The latter is pivotally secured at $l$, and its free end carries a curved bearing-plate $m$, upon which the free end of the rock-arm $n$ travels. The rock-arm $n$ is secured to the rock-shaft G and thereby transmits to it a rocking motion derived from the lifting motion imparted to the free end of the lever W by the cam U and the connection above described. The combined oscillating and rocking motion of the shaft G imparts to the feed-arms D D' the desired four-motion feed, which raises the same sufficiently high to carry the hooked end over and beyond the hoops and then, dropping the points of the hooked ends beyond said hoops, feed the same. The feed-arms have each two hooks $d'$ $d^2$, so arranged that one hook $d'$ feeds a hoop to the shears and the other hooks $d^2$ from the shears to the saws. These arms have the spring $y$ on their under side, one end being secured to the arm and the opposite ends having perforations, through which the inner hooks pass. These springs serve to free the hoops from the inner hooks and also equalize the pressure brought on the respective arms to compensate for irregularities in the hoop being acted upon.

The guides I I' are grooved to receive the hooks, so that the feed-arms may rest with their weight upon the hoops to keep them straight upon the bed, which is formed by the edges of said guides and by a central guide-bar I². As the guide-bar I' is carried by the adjustable carriage, the feed-arm D' has to be adjustably secured to the rock-shaft G by means of the set-screw $g^2$, in order that it may be moved to correspond with the movement of the saw A'.

While the hoop is subjected to the action of the shears it is kept down upon its bed at one end by the weight of the pressure-foot $o$, Figs. 1 and 11, which is pivotally secured at $p$, and has a slight indentation $q$ on its lower edge, which engages upon a hoop and prevents it from being accidentally displaced while the cutting-off shears are operating upon it. The other end of the hoop is kept down on its bed, as shown in Fig. 6, by the pressure-foot Y, which is provided upon its lower edge with a V-shaped recess $r$, by means of which the pressure-foot, as soon as the hoop is in the proper position, straddles the end of the hoop, and thereby centers it in relation to the pointing-shears, so that whether a hoop be wide or small its point will always be cut symmetrical by being centered between the shears.

To disengage the hoop again after the hoop is pointed, the pressure-foot is secured to a lever s, fulcrumed in a bracket or arm S⁴, and which is somewhat extended and curved, as shown in dotted lines in Figs. 5 and 10, to bring the same into proper position, and connect it by means of a rod t to the lever W, which thereby imparts to it the desired lifting motion to accomplish the object and also lower it to straddle the hoops. A slot t' in the lower end of rod t allows the pressure-foot Y a free vertical play irrespective of the lever W, so that hoops of different thickness may be easily forced under the pressure-foot.

While the ends of the hoops are carried under the saws they are kept down on the inclined beds B B' by the pressure-rolls C C', which are journaled at the ends of the pivotal arms u. Underneath these pressure-rolls sharp edges v (see Fig. 7) are provided in the bed and project slightly above the same. By these means the ends of the hoops are nipped between the pressure-rolls and the bed, and the action of the saw, which tends to pull the hoops in the direction of their length, is thereby counteracted. These sharp edges may be omitted under one of the pressure-rolls.

The shears L, which turn the ends of the hoops, are operated by suitable connection with the eccentric w, placed on the shaft T, such as shown in Fig. 11, wherein it will be seen that the knife L is secured to a curved lever-arm L², pivotally secured to the bed-plate and having a projection L³, to which a pitman L⁴ is pivotally secured, the opposite end of the pitman-rod being secured to the strap of the eccentric w. The eccentric w is adjustably located on shaft T, and as the shears L are carried by the bed B' the entire device for cutting the ends of the hoops partakes in the adjustment of the adjustable saw.

A lever z is connected with the pulley Q to engage or disengage it from the clutch d when it is desired to start or stop the machine. A small stop x is formed on the frame, with which the lever z engages for holding the lever in position. When the clutch is closed, the lever is disengaged from the stop by raising the same over it. Brackets Z are detachably hooked onto the front rail A³ to hold a bundle of hoops convenient for the operator to feed the same one by one and with one end of the hoops in contact against the stop-plate x.

What I claim is—

1. In a machine for pointing and lapping hoops, the combination, with a frame, of a fixed arbor mounted therein, a horizontal saw on the arbor, a longitudinally-adjustable arbor on the frame, a horizontal saw on the same, a single belt for driving the saws, an idler-pulley on which the belt passes, and means for adjusting the idler simultaneously with the adjustment of the adjustable saw.

2. In a machine for pointing and lapping hoops, the combination of two horizontally-running saws, one mounted in standards upon the supporting-frame and the other in standards secured upon a carriage which is adjustable from and toward the other saw, a drive-pulley on the arbor of each saw, an idler-pulley on the standard of the adjustable saw, and a drive-belt passing around said pulleys, substantially as described.

3. In a machine for pointing and lapping hoops, the combination of two horizontally-revolving saws and two bed-plates having inclined portions extending beneath the saws and horizontal portions extending out in front of the saws, above and clear of the frame to which they are attached at their edges, substantially as described.

4. In a machine for pointing and lapping hoops, the combination, with the two horizontally-revolving saws, of an adjustable carriage upon which one of the saws is mounted, the cutting-off shears operating in advance of the adjustable saw and secured to said carriage, and an eccentric longitudinally adjustable on its shaft for actuating the shears, substantially as described.

5. In a feeding device for machines for pointing and lapping hoops, the combination, with means for pointing and lapping the hoops, of the feed-arms D D', provided with fingers d d², the grooved guides I I', upon which the hoops are supported, and the compensating springs y, secured upon the under side of said feed-arms, substantially as described.

6. The combination of the two horizontally-revolving saws, the pressure-rolls C C', and the sharpened edges below these pressure-rolls to nip the hoops while the saws are operating, substantially as described.

7. The herein-described feed-movement, consisting of the oscillating arms H, provided with the slots, the rock-shaft G, journaled in said oscillating arms and carrying the feed-arms D D', the rock-arm n, secured upon said rock-shaft, the revolving shaft T, provided with the cam, the lever W, supported upon said cam and provided with the bearing m, upon which the rock-arm n rests, and the cranks j, engaging into the slots of the oscillating arms, substantially as described.

ALEXANDER F. WARD.

Witnesses:
H. S. SPRAGUE,
CHARLES J. HUNT.